(12) United States Patent
Srivastava

(10) Patent No.: US 9,982,593 B1
(45) Date of Patent: May 29, 2018

(54) INTERNAL COMBUSTION BUTTERFLY ENGINE

(71) Applicant: Aman Srivastava, Plano, TX (US)

(72) Inventor: Aman Srivastava, Plano, TX (US)

( * ) Notice: Subject to any disclaimer, the term of this patent is extended or adjusted under 35 U.S.C. 154(b) by 171 days.

(21) Appl. No.: 15/219,589

(22) Filed: Jul. 26, 2016

Related U.S. Application Data

(60) Provisional application No. 62/197,358, filed on Jul. 27, 2015.

(51) Int. Cl.
| | |
|---|---|
| F02B 53/00 | (2006.01) |
| F02B 55/14 | (2006.01) |
| F02B 53/06 | (2006.01) |
| F02B 53/12 | (2006.01) |
| F02B 55/02 | (2006.01) |
| F02B 55/08 | (2006.01) |
| F01B 3/00 | (2006.01) |

(52) U.S. Cl.
CPC .......... *F02B 55/14* (2013.01); *F01B 3/0079* (2013.01); *F02B 53/06* (2013.01); *F02B 53/12* (2013.01); *F02B 55/02* (2013.01); *F02B 55/08* (2013.01)

(58) Field of Classification Search
CPC ........ F01B 3/0079; F02B 53/00; F02B 75/26; F02B 2075/125; F02B 55/14; F02B 53/06; F02B 53/12; F02B 55/02; F02B 55/08; F16J 1/24; F01C 9/002
USPC .................................... 123/18 A, 45 R, 45 A
See application file for complete search history.

(56) References Cited

U.S. PATENT DOCUMENTS

| | | | | |
|---|---|---|---|---|
| 2,232,802 | A * | 2/1941 | Retschy ..................... | F16J 1/24 123/45 R |
| 3,750,630 | A * | 8/1973 | Hariman ................ | F01B 3/0079 123/45 A |
| 6,270,322 | B1 * | 8/2001 | Hoyt ....................... | F01C 9/002 123/18 A |
| 2007/0181101 | A1* | 8/2007 | Tardif ..................... | F01C 1/073 123/45 R |
| 2011/0132309 | A1* | 6/2011 | Turner .................... | F01C 1/073 123/18 A |

* cited by examiner

*Primary Examiner* — Marguerite McMahon
(74) *Attorney, Agent, or Firm* — Richard G. Eldredge; Eldredge Law Firm

(57) ABSTRACT

An internal combustion butterfly engine system includes a cylindrical housing; a first cylindrical snitch rotabably carried within the cylindrical housing and having a first tab and a second tab; a second cylindrical snitch rotabably carried within the cylindrical housing; a plurality of chambers; a plurality of spark plugs secured to the cylindrical housing and in gaseous communication with the plurality of chambers; a plurality of injectors secured to the cylindrical housing and in gaseous communication with the plurality of chambers; a bevel gear mechanism disposed within a center opening formed by the cylindrical housing, the first cylindrical snitch, and the second cylindrical snitch, the bevel gear mechanism is configured to cause the first cylindrical snitch to rotate in a direction opposite to a rotation of the second cylindrical snitch within the housing; and a ratchet and pawl mechanism disposed within the center opening and secured to the first cylindrical snitch and the second cylindrical snitch.

1 Claim, 4 Drawing Sheets

INTERNAL COMBUSTION BUTTERFLY ENGINE

BACKGROUND

1. Field of the Invention

The present invention relates generally to internal combustion engines, and more specifically, a ratcheting snitch butterfly engine.

2. Description of Related Art

Internal combustion engines are well known in the art and provide a viable means of producing mechanical power by burning fuel. In FIG. 1, a conventional internal combustion engine system 101 is shown. System 101 depicts a cylinder of a single or multi-cylinder internal combustion engine in which the cylinders could be arranged in many ways; e.g. inline, V-shaped, W-shaped, L-shaped, etc. System 101 includes a snitch 103, crank shaft 105, and connection rod 107. The said engine could be 2-stroke, 4-stroke, air cooled, or water cooled and could be used in vehicles, aircraft, boats, models, tools, etc.

As depicted in System 101, the snitch 103 moves linearly in a vertical direction which is typically guided by a cylinder. As the snitch 103 reciprocates, linear motion is converted into rotary motion through the connection rod 107 and crank shaft 105.

Internal combustion engines similar which are configured similar to that of system 101 are commonly large in size due to the arrangement of moving parts. There are many applications which could benefit from a smaller, highly efficient, internal combustion engine. This is viewed as a disadvantage of conventional internal combustion engines.

Although great strides have been made in the area of internal combustion engine systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
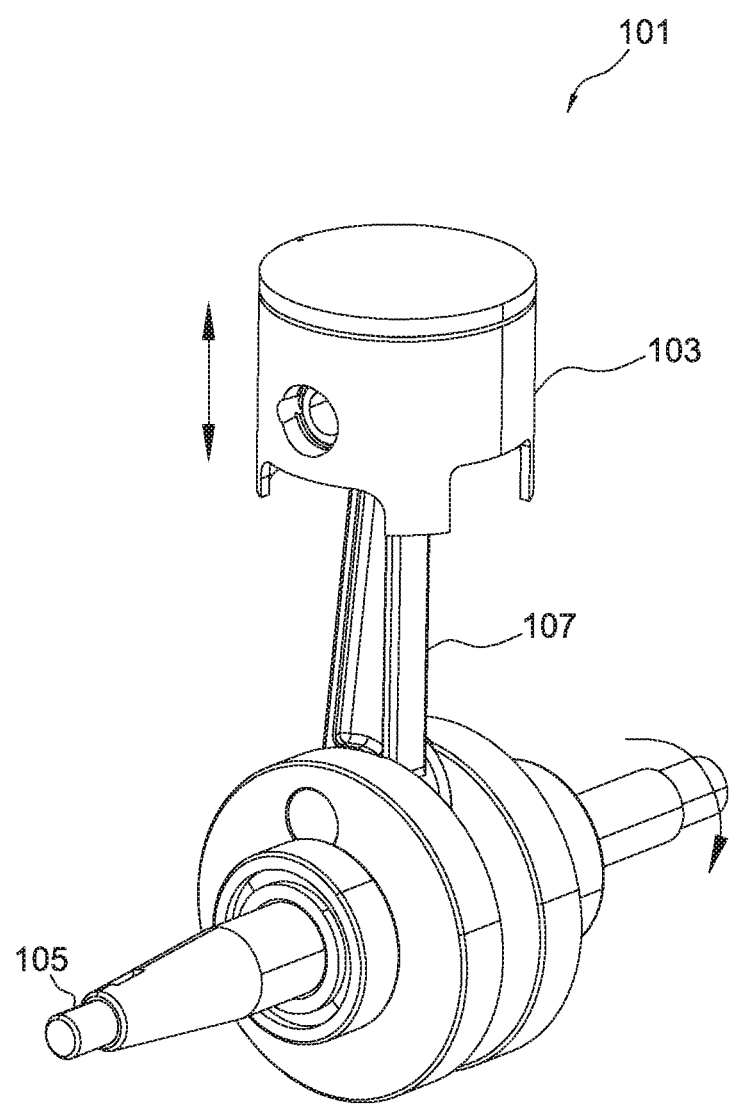
FIG. 1 is an oblique view of a conventional internal combustion engine.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional internal combustion engine systems. Specifically, the system of the present application provides a new and useful internal combustion engine; namely, a butterfly engine. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2A:
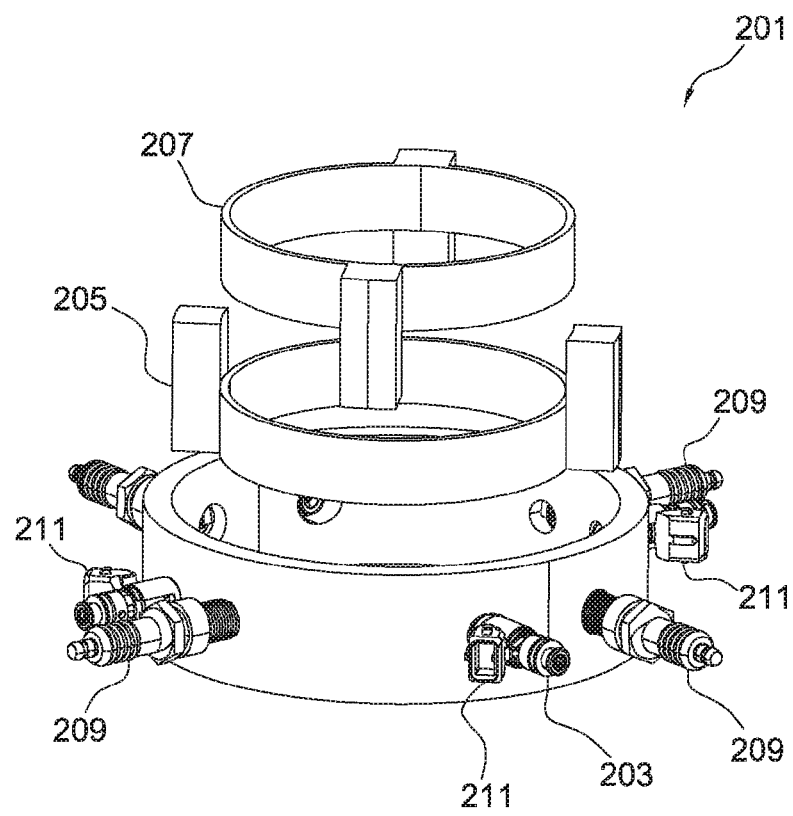
FIGS. 2A & 2B are oblique views in accordance with a preferred embodiment of the present application.
Figure 2B:
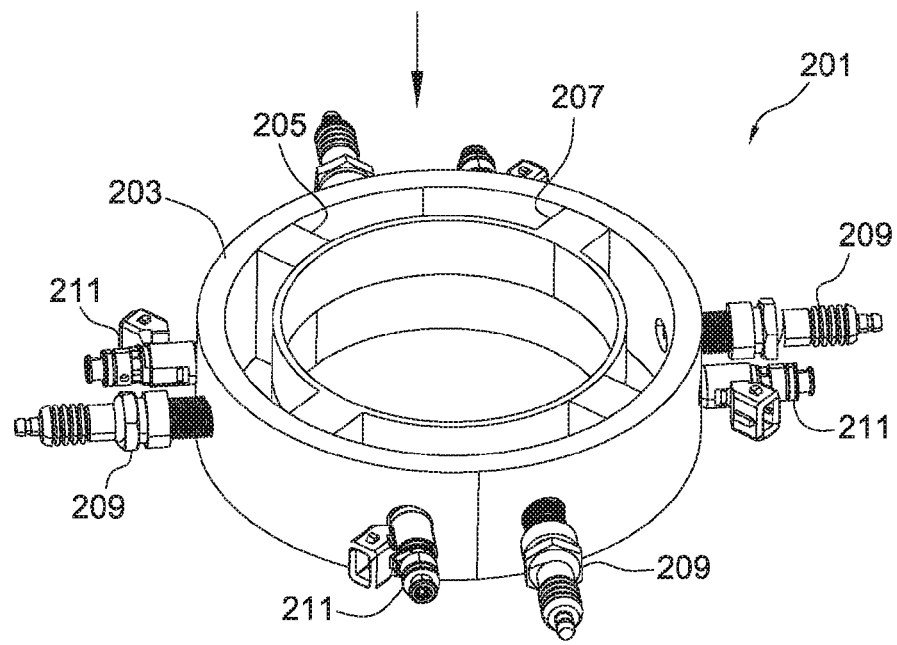

Referring now to the drawings wherein like reference characters identify corresponding or similar elements throughout the several views, FIGS. 2A & 2B depict an internal combustion butterfly engine in accordance with a preferred embodiment of the present application. It will be appreciated that the butterfly engine system 201 overcomes one or more of the above-listed problems commonly associated with conventional internal combustion engine systems.

In a preferred embodiment, system 201 includes snitches 205 & 207 which rotate in housing 203. One or more pairs of spark plugs 209 and fuel injectors 211 are fixably mounted to the engine housing 203 which provide fuel and ignition, respectively. It is contemplated that seals will be used between the housing 203 and snitches 205 & 207 to provide for a closed combustion chamber. It is appreciated that the snitches 205 & 207 contain a protruding tab on their outer diameters which formably creates chambers. It is also appreciated that snitches 205 and 207 are mechanically timed using gearing which will be discussed below. It is contemplated that bearings (journal, friction, ball, or any other type) can be incorporated between the snitches 205 and 207 to provide for low friction rotary motion.

Figure 3A:
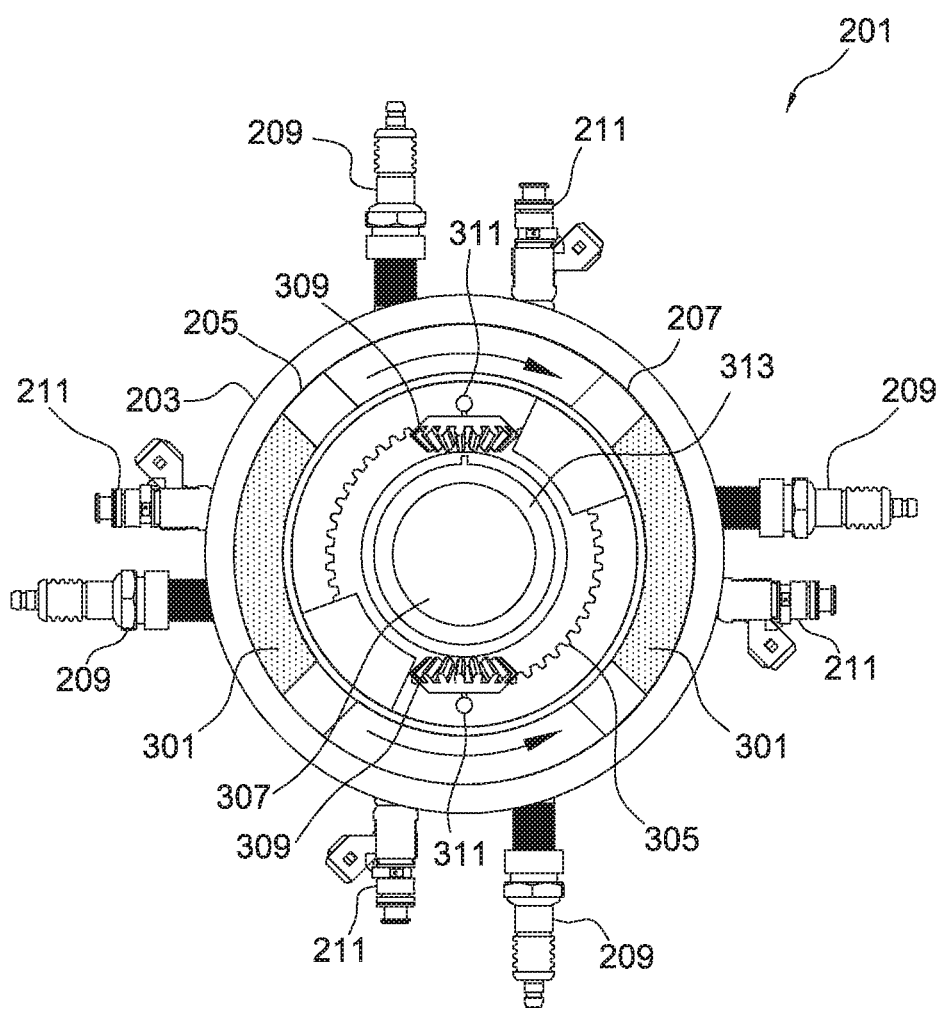
FIGS. 3A & 3B are section views of the butterfly engine system of FIGS. 2A & 2B.
Figure 3B:
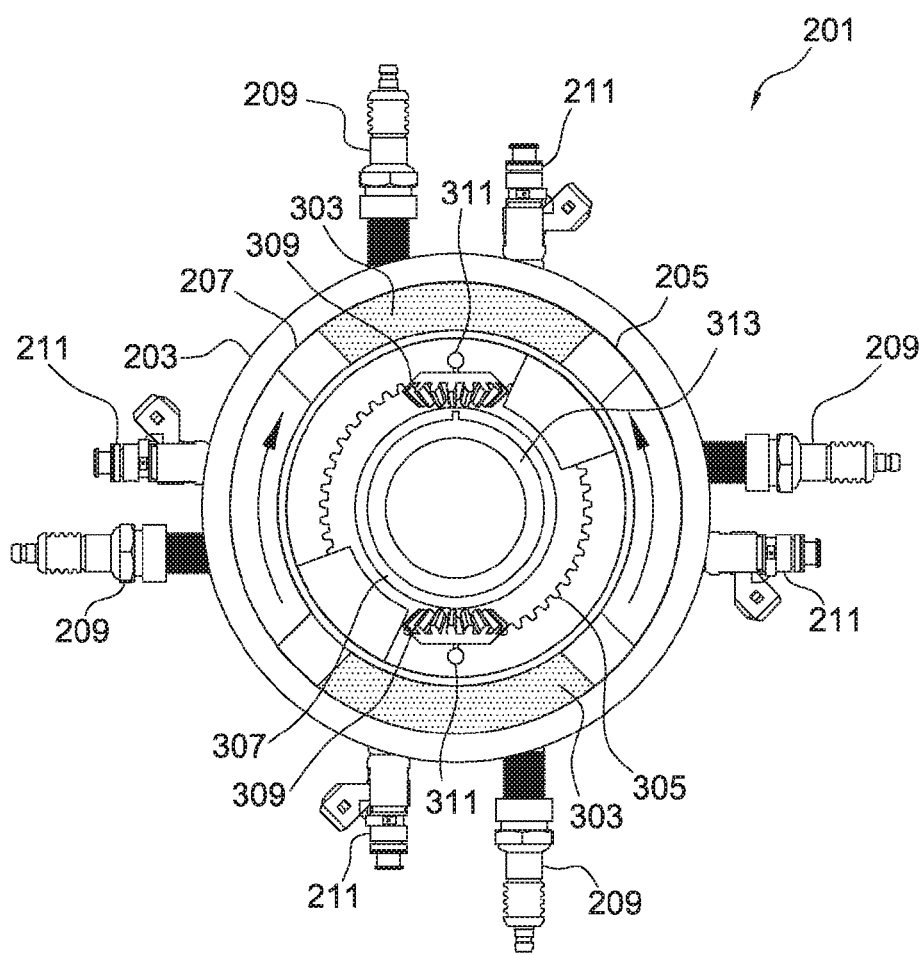

Referring now to FIGS. 3A & 3B, section views of system 201 are shown which depict the operation of system 201. The snitches 205 & 207 have a bevel gear arrangement inside so as to allow the motion of both the snitches simultaneously in opposite directions. This bevel gear arrangement 305 & 311 is similar to the one found in the differential of an automobile. This arrangement can be replaced with some other arrangement; however, the idea is still the same so as to force both snitches to move in opposite directions. A ratchet & pawl mechanism 313 (similar to the one found in bicycles) is incorporated inside the bevel gears. This mechanism is coupled to the output shaft and helps in rotating it only in one direction. During the operation of the engine, the snitches move in opposite directions to each other all the time. Hence, in order to provide the movement of the output shaft in only one direction this ratchet and pawl mechanism 313 comes in help.

In FIG. 3A one or more combustion chambers 301 are shown containing fuel which was inserted by fuel injectors 211. As the fuel in combustion chambers 303 is ignited by the spark plugs 209, the combustion forces cause the snitches 205 and 207 to rotate in opposite directions as shown by the directional arrows. The rotary motion of the snitches 205 and 207 is transmitted through the bevel gears and the ratchet and pawl mechanism 313 to the output shaft 307. It should be noted that both the snitches are moving in opposite directions. However, the output shaft 307 only rotates in one direction due to the ratchet and pawl mechanism 313. This is viewed as an advantage of the system of the present application.

In FIG. 3B, one or more different combustion chambers 303 are shown containing fuel which was inserted by fuel injectors 211. As the fuel in combustion chambers 303 is ignited by the spark plugs 209, the combustion forces cause the pistons 205 and 207 to rotate in different opposing directions back to their original position as shown in the directional arrows. The rotary motion of the snitches 205 & 207 back to their original position is transmitted through the bevel gears and the ratchet and pawl mechanism 313 to the output shaft 307. It should be noted that both the snitches are moving in opposite directions. However, the output shaft 307 only rotates in one direction due to the ratchet and pawl mechanism 313. As the snitches 205 & 207 are back in their original position the exhaust gases shall be vented out from the valves and fresh air-fuel mixture shall be injected inside. This shall cause the snitches to move back in opposite directions again. Similar exhaust and intake shall be carried out in the other two chambers shown. This can be found to be identical to the 2 stroke/4 stroke of a conventional internal combustion engine. In this way the snitches shall keep moving in opposite directions creating combustions chambers between them and causing the output shaft to move in one direction only due to the ratchet and pawl mechanism 313. System 201 is referred to as a butterfly engine since the snitches 205 & 207 reciprocate back and forth like butterfly wings.

It is contemplated that a mechanism for conserving the angular momentum of the snitches also can be included. Although this mechanism is not covered herein, an equivalent mechanism apparent to those skilled in the art having the benefit of the teaching herein can be included.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An internal combustion butterfly engine system, comprising:
    a cylindrical housing having a thickness from an inner surface to an outer surface;
    a first cylindrical snitch rotabably carried within the cylindrical housing and having a first tab and a second tab, the first tab and the second tab are slidingly engaged with the inner surface of the cylindrical housing;
    a second cylindrical snitch rotabably carried within the cylindrical housing and having a third tab and a fourth tab, the third tab and the fourth tab are slidingly engaged with the inner surface of the cylindrical housing;
    a plurality of chambers formed between the inner surface of the cylindrical housing, the first cylindrical snitch, the second cylindrical snitch, the first tab, the second tab, the third tab, and the fourth tab;
    a plurality of spark plugs secured to the cylindrical housing and in gaseous communication with the plurality of chambers;
    a plurality of injectors secured to the cylindrical housing and in gaseous communication with the plurality of chambers;
    a bevel gear mechanism disposed within a center opening formed by the cylindrical housing, the first cylindrical snitch, and the second cylindrical snitch, the bevel gear mechanism is configured to cause the first cylindrical snitch to rotate in a direction opposite to a rotation of the second cylindrical snitch within the housing; and
    a ratchet and pawl mechanism disposed within the center opening and secured to the first cylindrical snitch and the second cylindrical snitch;
    wherein the plurality of injectors injects gas within the plurality of chambers;
    wherein the plurality of spark plugs ignites the gas within the plurality of chamber, which in turn causes an expansion of the gas;
    wherein the expansion of gas causes the tabs to move, which in turn rotates the first cylindrical snitch and the second cylindrical snitch; and
    wherein movement of the first cylindrical snitch and the second cylindrical snitch rotates the ratchet and pawl mechanism, which in turn rotates a shaft connected thereto.

* * * * *